$$\rho(r) = \frac{(b\rho_a - a\rho_b)}{b-a} + \frac{(\rho_b - \rho_a)}{b-a} r \quad (5)$$

The linear variation of the mass density can be achieved by combining modest amounts of lead powder to the epoxy matrix material. The general solution to the differential equation 4, subject to the mass variation given in equation 5, is $$u = C_1(1+k)(k-\nu_{\theta r})(r/b)^k - C_2(1-k)(k+\nu_{\theta r})(r/b)^{-k} - \quad (6)$$

$$\frac{\omega^2(1-\nu_{\theta r}\nu_{r\theta})r^3}{b-a}\left\{\frac{(b\rho_a - a\rho_b)}{9E_r - E_\theta} + \frac{(\rho_b - \rho_a)}{16 E_r - E_\theta} r\right\}$$

The constants $C_1$ and $C_2$ can be determined from the radial stress boundary conditions of $$\sigma_r(a) = 0 \; \sigma_r(b) = 0 \quad (7)$$

The solution of equaton 6 subject to the radial stress boundary conditions gives the radial displacement u as $$\frac{\omega^2 b^3(k-\nu_{\theta r})(r/b)^k}{E_\theta(b-a)(C^k - C^{-k})}\left\{\frac{(b\rho_a - a\rho_b)(3 + \nu_{\theta r})(C^3 - C^{-k})}{9-k^2} + \right.$$

$$\left. \frac{b(\rho_b - \rho_a)(4 + \nu_{\theta r})(C^4 - C^{-k})}{16 - k^2}\right\} +$$

$$\frac{\omega^2 b^3(k+\nu_{\theta r})(r/b)^{-k}}{E_\theta(b-a)(C^k - C^{-k})}\left\{\frac{(b\rho_a - a\rho_b)(3 + \nu_{\theta r})(C^3 - C^k)}{9 - k^2} + \right.$$

$$\left. \frac{b(\rho_b - \rho_a)(4 + \nu_{\theta r})(C^4 - C^k)}{16 - k^2}\right\} -$$

$$\frac{\omega^2 b^3 (k^2 - \nu_{\theta r}^2)(r/b)^3}{E_\theta(b-a)}\left\{\frac{(b\rho_a - a\rho_b)}{9 - k^2} + \frac{b(\rho_b - \rho_a)(r/b)}{16 - k^2}\right\}$$

Knowing the radial displacement, the radial and hoop stress components can be found from $$\sigma_\theta(r) = \frac{E_\theta}{1 - \nu_{r\theta}\nu_{\theta r}}\left(\frac{u}{r} + \nu_{r\theta}\frac{du}{dr}\right) \quad (9)$$

$$\sigma_r(r) = \frac{E_r}{1 - \nu_{r\theta}\nu_{\theta r}}\left(\frac{du}{dr} + \nu_{\theta r}\frac{u}{r}\right)$$

Thus radial stress is $$\sigma_r = \quad (10)$$

$$\frac{\omega^2 b^2(r/b)^{k-1}}{(b-a)(C^k - C^{-k})}\left\{\frac{(b\rho_a - a\rho_b)(3 + \nu_{\theta r})(C^3 - C^{-k})}{9 - k^2} + \right.$$

$$\left. \frac{b(\rho_b - \rho_a)(4 + \nu_{\theta r})(C^4 - C^{-k})}{16 - k^2}\right\} -$$

$$\frac{\omega^2 b^2(r/b)^{-k-1}}{(b-a)(C^k - C^{-k})}\left\{\frac{(b\rho_a - a\rho_b)(3 + \nu_{\theta r})(C^3 - C^k)}{9 - k^2} + \right.$$

$$\left. \frac{b(\rho_b - \rho_a)(4 + \nu_{\theta r})(C^4 - C^k)}{16 - k^2}\right\} -$$

$$\frac{\omega^2 b^2(r/b)^2}{(b-a)}\left\{\frac{(3 + \nu_{\theta r})(b\rho_a - a\rho_b)}{9 - k^2} + \right.$$

$$\left. \frac{b(\rho_b - \rho_a)(4 + \nu_{\theta r})(r/b)}{16 - k^2}\right\}$$

and the hoop stress is $$\sigma_\theta = \quad (11)$$

$$\frac{\omega^2 b^2 k(r/b)^{k-1}}{(b-a)(C^k - C^{-k})}\left\{\frac{(b\rho_a - a\rho_b)(3 + \nu_{\theta r})(C_3 - C^{-k})}{9 - k^2} + \right.$$

$$\left. \frac{b(\rho_b - \rho_a)(4 + \nu_{\theta r})(C^4 - C^{-k})}{16 - k^2}\right\} +$$

$$\frac{\omega^2 b^2 k(r/b)^{-k-1}}{(b-a)(C^k - C^{-k})}\left\{\frac{(b\rho_a - a\rho_b)(3 + \nu_{\theta r})(C^3 - C^k)}{9 - k^2} + \right.$$

$$\left. \frac{b(\rho_b - \rho_a)(4 + \nu_{\theta r})(C^4 - C^k)}{16 - k^2}\right\} -$$

$$\frac{\omega^2 b^2(r/b)^2}{(b-a)}\left\{\frac{(k^2 + 3\nu_{\theta r}b\rho b\nu_a - a\rho_b)}{9 - k^2} + \right.$$

$$\left. \frac{(k^2 + 4\nu_{\theta r})b(\rho_b - \rho_a)(r/b)}{16 - k^2}\right\}$$

Note that the degenerate case of $\rho_a = \rho_b$ coincides with the usual orthotropic theory which, in turn, is an extension of the classical isotropic solution.

The single rim, multilayer composite flywheel design assumes a relatively inexpensive, ballasted glass fiber inner-rim contained by a Kevlar outer-rim. Schematically this concept is depicted by the two concentric orthotropic disks shown in FIG. 13.

To determine the total stress and deformation distribution of the concentric disks, one must insure that there is a continuity of radial stress and radial displacement at the interface of the two disks. These conditions will be satisfied by the following solution strategy:

1. Determine the radial growth of each composite disk individually at the interface due to spinning. See equation (8). Denote the radial growth of disk 1 as $u_{r1}$

TORSIONAL OSCILLATION DAMPER FOR COMBUSTION-ENGINE CRANKSHAFT

FIELD OF THE INVENTION

The present invention relates to a torsional oscillation damper. More particularly this invention concerns such a damper that is used on the crankshaft of a combustion engine.

BACKGROUND OF THE INVENTION

A standard torsional vibration damper of the type used on the crankshaft of a combustion engine normally is comprised of a relatively light and a relatively heavy mass. The light mass is rigidly fixed to the shaft whose oscillations are to be damped and is connected via an elastomeric body with the relatively heavy mass.

Such a device has the function of damping angular oscillations. The heavy mass has a resonant frequency with respect to the light mass which is increased by the mass of the shaft. This resonant frequency is a function of the mass of the heavy mass and the spring constant of the elastomeric body. Normally the resonant frequency is set so that it is approximately equal to that of the shaft. Thus as the damping mass resonates it uses energy and thereby damps the vibrations in the shaft.

This system has the considerable disadvantage that its service life is normally relatively short. Since virtually all of the energy absorbed in the damping action is transformed into heat, the elastomeric body becomes relatively hot. Normally such elastomeric bodies are poor conductors of heat so that in a relatively short time they disintegrate due to the heat. This can be reduced by making the elastomer relatively stiff, which requires an even heavier mass connected to it to achieve the desired resonant frequency. The result is a bulky assembly which will still have a relatively reduced service life. As such a device is normally mounted directly on the engine crankshaft, replacing it is an extremely difficult chore.

OBJECTS OF THE INVENTION

It is therefore an object of the present invention to provide an improved torsional oscillation damper.

Another object is to provide such a damper which will have a relatively long service life.

SUMMARY OF THE INVENTION

These objects are attained according to the instant invention in a torsional oscillation damper having a relatively light annular disk that is centered on and rotatable about an axis, and that is normally rigidly connected with the crankshaft whose oscillations are to be damped. A rigid abutment disk also centered on and rotatable about this axis is spaced axially from but is fixed axially and rotatably to this light disk. A relatively heavy annular disk is centered on and rotatable about the axis independently of the light and abutment disks and lies between these light and abutment disks. A soft annular elastomeric ring is engaged axially between the heavy and light disks and a ring of friction material is engaged axially between the heavy and the abutment disks. Thus with the system of the instant invention it is possible to use a relatively soft elastomer so that virtually any desired resonant frequency can be obtained. Much of the damping takes place frictionally, between a ring of friction material and the rigid abutment disk, both of which are constituted so that they can readily withstand and dissipate heat.

According to the instant invention spring means is provided for urging the ring of friction material axially against one of the heavy and abutment disks. The ring of friction material is rotationally coupled to the other of the heavy and abutment disks. The friction ring is normally between the abutment and heavy disks. The spring can be constituted as a single large Belleville washer.

According to the instant invention it is possible to constitute the ring of friction material as a sort of slip clutch. To this end the ring of friction material is mounted on a pressure ring which is rotationally linked to the heavy disk and which is biased away from the heavy disk toward the abutment disk by means of the above-discussed spring. Rotational linking can be effected by means of pins engaged in axially aligned holes in the pressure and heavy disks, with some of these holes receiving the pins with play to allow relative axial displacement of the pressure and heavy disks. The use of such a ring allows the entire arrangement to be prestressed together. In fact, according to this invention, the elastomeric ring is itself normally compressed between the heavy and light disks, so that even though a relatively soft elastomer is used it is possible to obtain virtually any desired resonant frequency for the assembly.

According to another feature of this invention either the light disk or the abutment disk is formed with a surface centered on the axis and carrying a centering ring whose inner periphery engages this surface and whose outer periphery engages the inner periphery of the heavy disk. This centering ring, while allowing the heavy disk to turn about the axis relative to the light and abutment disks, nonetheless ensures perfect centering of the heavy disk to eliminate the possibility of excessive radial throw due to eccentric positioning of the heavy disk. The friction ring ensures that the heavy disk remains perfectly parallel to the light disk so as to prevent it fron canting and developing its own desired vibrations.

BRIEF DESCRIPTION OF THE DRAWING

FIGS. 1 and 2 are axial sections through torsional oscillation dampers according to the instant invention.

SPECIFIC DESCRIPTION

Figure 1:
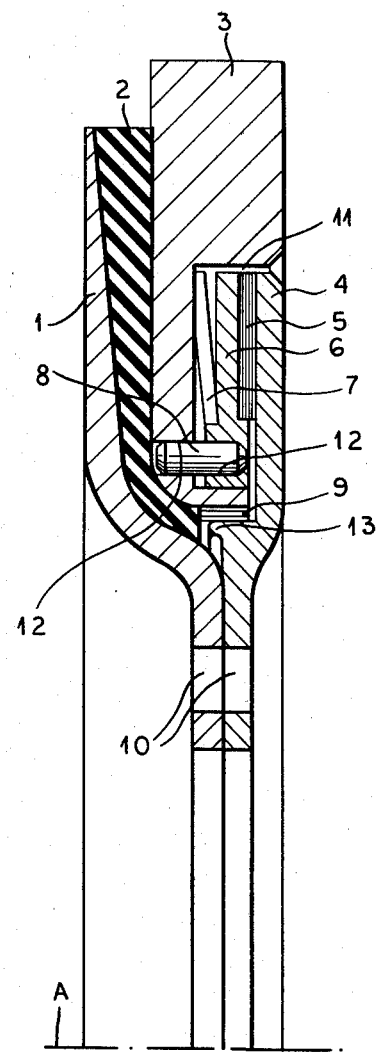

A torsional oscillation damper according to the instant invention basically comprises a light and outwardly tapered steel disk 1 centered on an axis A and normally bolted to the end of a combustion-engine crankshaft through a plurality of angularly equispaced holes 10. A radially inwardly tapering ring 2 of elastomeric material is engaged between the frustoconical axial face of the light disk 1 and a planar axial face of a relatively heavy annular disk 3 of slightly greater outer diameter.

In addition bolted with the light disk 1 to the crankshaft is a rigid abutment disk 4 of smaller diameter than either of the disks 1 and 3 and having a planar face turned toward the disk 1 and engaging a ring 5 of friction material of the type used in brakeshoes or clutches, fitted to a pressure ring 6. One or more springs which may be constituted as Belleville washers 7 press this pressure ring 6 away from the heavy disk 3 and toward the planar face of the abutment disk 4, simultaneously pressing the ring 5 of friction material against the face of the disk 4 and prestressing the ring 2 of elastomeric material.

To this end the heavy disk 3 is of L-section and formed with an axially open recess 11 in which the abutment disk 4, friction ring 5, pressure ring 6, and spring 7 are all received. Furthermore the pressure ring 6 and heavy disk 3 are formed with axially aligned holes 12 receiving pins 8 that rotationally couple these two elements 3 and 6 together, while permitting relative axial displacement of them. Finally the abutment disk 4 is formed with a ridge or shoulder 13 itself forming a cylindrical surface centered on the axis A and engaging the inner periphery of a centering ring 9 whose outer periphery engages the inner periphery of the heavy disk 3 so as to keep it axially centered. One set of the holes 12 may even be elongated somewhat angularly to allow a very limited amount of relative rotation between the parts 3 and 6.

FIG. 2 shows another torsional damper according to the invention. Reference numerals identical to those of FIG. 1 refer to functionally identical structure.

The damper according to the instant invention therefore damps not only by means of the elastomeric mass 2, but by generating friction between the ring 5 and the disk 4. The disk 4 can readily dissipate heat, as it is normally made of a cast metal, so that the elastomer of the ring 2 can be a relatively soft one. Since the springs 7 assure precompression or stressing of this ring 2 it is therefore also possible to obtain virtually any desired resonant frequency with the damper according to the instant invention.

I claim:

1. A torsional oscillation damper comprising:
   a relatively light annular disk centered on and rotatable about an axis;
   a rigid abutment disk centered on and rotatable about said axis, said abutment disk being spaced axially from said light disk;
   a relatively heavy annular disk centered on and rotatable about said axis independently of at least one of said light and abutment disks, said abutment disk being fixed axially and rotationally to one of said light and heavy disks;
   an annular soft elastomeric ring engaged between said light and heavy disks;
   a ring of friction material engaged axially between said abutment disk and one of said light and heavy disks, said abutment disk being formed with an annular ridge centered on said axis; and
   a centering ring between said ridge and said heavy disk.

2. A torsional oscillation damper comprising:
   a relatively light annular disk centered on and rotatable about an axis; a rigid abutment disk centered on and rotatable about said axis, said abutment disk being spaced axially from said light disk;
   a relatively heavy annular disk centered on and rotatable about said axis independently of at least one of said light and abutment disks, said abutment disk being fixed axially and rotationally to one of said light and heavy disks;
   an annular soft elastomeric ring engaged between said light and heavy disks; and
   a ring of friction material engaged axially between said abutment disk and one of said heavy and light disks, said light disk tapering radially outwardly and said elastomeric ring tapering radially inwardly.

3. A torsional oscillation damper comprising:
   a relatively light annular disk centered on and rotatable about an axis;
   a rigid abutment disk centered on and rotatable about said axis, said abutment disk being spaced axially from said light disk;
   a relatively heavy annular disk centered on and rotatable about said axis independently of at least one of said light and abutment disks, said abutment disk being fixed axially and rotationally to one of said light and heavy disks;
   an annular soft elastomeric ring engaged between said light and heavy disks;
   a ring of friction material engaged axially between said abutment disk and one of said light and heavy disks; and
   spring means for urging said ring of friction material axially against one of the respective disks it engages axially and for rotationally coupling said ring of friction material to the other respective disk it engages axially, said spring means including:
      a pressure ring rotationally linked to said other disk and to said ring of friction material and axially displaceable relative to said disks, said other disk and said pressure ring being formed with respective axially aligned holes,
      at least one spring between said pressure ring and said other disk, and
      respective pins each extending axially through a respective one of the holes of said other disk and the respective hole of said pressure ring.

4. The damper defined in claim 3 wherein said abutment disk is fixed axially and rotationally to said light disk and said heavy disk lies between said light and abutment disks, said elastomeric ring being engaged axially between said light and heavy disks.

5. The damper defined in claim 3 wherein the holes in said pressure ring receive the respective pins with limited play.

* * * * *